(12) United States Patent
Shii et al.

(10) Patent No.: US 9,221,315 B2
(45) Date of Patent: Dec. 29, 2015

(54) CYLINDER UNIT

(75) Inventors: Hisato Shii, Minokamo (JP); Akira Naito, Kago (JP); Tatsuya Sukegawa, Komaki (JP); Kazuhiro Hayashi, Kasugai (JP); Takashi Ominami, Kasugai (JP)

(73) Assignees: KAYABA INDUSTRY CO., LTD., Tokyo (JP); CHITA KOGYO CO., LTD., Aichi (JP)

( * ) Notice: Subject to any disclaimer, the term of this patent is extended or adjusted under 35 U.S.C. 154(b) by 0 days.

(21) Appl. No.: 14/005,398

(22) PCT Filed: Feb. 24, 2012

(86) PCT No.: PCT/JP2012/054540
§ 371 (c)(1),
(2), (4) Date: Sep. 16, 2013

(87) PCT Pub. No.: WO2012/124451
PCT Pub. Date: Sep. 20, 2012

(65) Prior Publication Data
US 2014/0001690 A1    Jan. 2, 2014

(30) Foreign Application Priority Data

Mar. 17, 2011 (JP) .................................. 2011-058741

(51) Int. Cl.
*F16F 9/58* (2006.01)
*B60G 15/06* (2006.01)
(Continued)

(52) U.S. Cl.
CPC .............. *B60G 15/061* (2013.01); *F16F 9/585* (2013.01); *F16F 13/007* (2013.01); *F16F 1/04* (2013.01)

(58) Field of Classification Search
CPC ............................... F16F 9/585; B60G 15/061
USPC .................................................. 267/226, 221
See application file for complete search history.

(56) References Cited

U.S. PATENT DOCUMENTS 1,745,357 A * 2/1930 Crowell .............................. 92/9
1,794,807 A * 3/1931 Thompson .................... 188/288
1,840,178 A * 1/1932 Transom ......................... 267/34
(Continued)

FOREIGN PATENT DOCUMENTS

DE    102004005063 A1 *  9/2005  ............... F16F 9/49
JP    5-321969 A    12/1993
(Continued)

OTHER PUBLICATIONS

International Search Report and Written Opinion corresponding to PCT/JP2012/054540, dated Apr. 24, 2012.
(Continued)

*Primary Examiner* — Thomas Irvin
(74) *Attorney, Agent, or Firm* — Hauptman Ham, LLP

(57) ABSTRACT

A cylinder unit includes a cylinder, a rod guide, a piston, a piston rod, and a rebound member provided between the rod guide and the piston to absorb impact generated when the cylinder unit is fully extended. The rebound member includes a coil spring arranged around an outer circumference of the piston rod and a pair of upper and lower holder members fitted to the fixing portions formed in both ends of the coil spring so that the piston rod is inserted into a shaft center hole. The center portion formed between the fixing portions of the coil spring has a diameter smaller than that of the fixing portion.

10 Claims, 4 Drawing Sheets

(51) Int. Cl.
*F16F 13/00* (2006.01)
*F16F 1/04* (2006.01)

(56) References Cited

U.S. PATENT DOCUMENTS

| | | | | |
|---|---|---|---|---|
| 3,297,312 | A * | 1/1967 | Hines | 267/34 |
| 4,318,535 | A * | 3/1982 | Imai | 267/226 |
| 5,265,710 | A | 11/1993 | Gabas et al. | 192/111.12 |
| 6,401,886 | B1 * | 6/2002 | Liang | 188/322.17 |
| 6,626,274 | B2 * | 9/2003 | Pfundstein et al. | 188/284 |
| 7,032,727 | B2 * | 4/2006 | Vanspauwen | 188/284 |
| 7,156,213 | B2 * | 1/2007 | Vanspauwen | 188/284 |
| 7,252,031 | B2 * | 8/2007 | Nakamura et al. | 92/85 A |
| 7,661,663 | B2 * | 2/2010 | Fritz et al. | 267/221 |
| 8,127,901 | B1 * | 3/2012 | Lu | 188/322.15 |
| 2004/0060787 | A1 * | 4/2004 | Nakamura et al. | 188/316 |
| 2005/0016805 | A1 * | 1/2005 | Brehm et al. | 188/315 |
| 2009/0107781 | A1 * | 4/2009 | Fritz et al. | 188/280 |
| 2015/0204411 | A1 * | 7/2015 | Kus et al. | 188/313 |

FOREIGN PATENT DOCUMENTS

| | | |
|---|---|---|
| JP | 2001-193782 A | 7/2001 |
| JP | 2004-183731 A | 7/2004 |
| JP | 2004-286140 A | 10/2004 |
| JP | 2006-132620 A | 5/2006 |
| JP | 2006-138367 A | 6/2006 |
| WO | 2010/003896 A1 | 1/2010 |

OTHER PUBLICATIONS

Office Action issued Oct. 20, 2014, corresponding to Chinese patent application No. 201280013285.1.

* cited by examiner

CYLINDER UNIT

RELATED APPLICATIONS

The present application is a National Phase of International Application Number PCT/JP2012/054540, filed Feb. 24, 2012, and claims priority from Japanese Application Number 2011-058741 Mar. 17, 2011.

TECHNICAL FIELD

The present invention relates to a cylinder unit.

BACKGROUND ART

There have been various proposals for a cylinder unit used in a hydraulic shock absorber, a gas spring, and the like until now. A cylinder unit is interposed, for example, between a chassis and an axle of an automobile to absorb a vibration inputting to a wheel on an uneven road surface.

JP05-321969A discloses a conventional cylinder unit. This cylinder unit includes a cylinder, an annular rod guide provided in one end side of the cylinder, a piston having an outer circumference slidably adjoining an inner circumference of the cylinder to divide an inner space of the cylinder into a pair of chambers, and a piston rod movably inserted into the cylinder by interposing a piston so as to pass through a rod guide.

The cylinder unit has a rebound member provided between the rod guide and the piston to absorb impact generated when the cylinder unit is fully extended. The rebound member includes a coil spring arranged around an outer circumference of the piston rod and a pair of upper and lower holder members fitted to fixing portions formed in both ends of the coil spring.

The upper holder member is slidably provided in an outer circumference of the piston rod. The lower holder member is forcibly inserted into the outer circumference of the piston rod and is fixed vertically over the piston.

In a case where the cylinder unit is extended, the piston rod exits from the cylinder, and the piston approaches the rod guide. When the cylinder unit is fully extended, the coil spring is compressed to absorb impact caused by the fully extension.

As illustrated in FIG. 4, the coil spring 600 is a wire rod having a circular cross section and including coil portions 600a, 600b, 600c, and 600d forming to be continuously connected in an axial direction. When the cylinder unit is fully extended, the vertically neighboring coil portions abut on each other to make a fully compressed state. In this case, the neighboring coil portions may slip from each other, and a part of the coil springs 600b may be moved by a distance f2 in a radial direction so as to generate an abnormal noise.

In this regard, the applicant proposed a technique of preventing a slide of the coil portion by making the cross section of the coil spring, for example, in a rectangular shape as disclosed in JP 2006-132620A.

SUMMARY OF INVENTION

The cylinder unit disclosed in JP 2006-132620A is useful because it is possible to suppress generation of an abnormal noise. However, the coil spring becomes expensive.

It is therefore an object of this invention to provide a cylinder unit capable of suppressing generation of an abnormal noise without changing a cross-sectional shape of the coil spring.

According to one aspect of the present invention, a cylinder unit is provided which comprises a cylinder; an annular rod guide provided in one end side of the cylinder; a piston having an outer circumference slidably adjoining an inner circumference of the cylinder; a piston rod that is movably inserted into the cylinder by interposing the piston so as to pass through the rod guide; and a rebound member provided between the rod guide and the piston to absorb impact generated when the cylinder unit is fully extended, wherein the rebound member has a coil spring arranged around an outer circumference of the piston rod and a pair of upper and lower holder members fitted to the fixing portions formed in both ends of the coil spring and in which the piston rod is inserted into a shaft center hole, and a center portion formed between the fixing portions of the coil spring has a diameter smaller than that of the fixing portion.

Embodiments of the present invention and advantages thereof are described in detail below with reference to the accompanying drawings.

DESCRIPTION OF EMBODIMENTS

Figure 1:
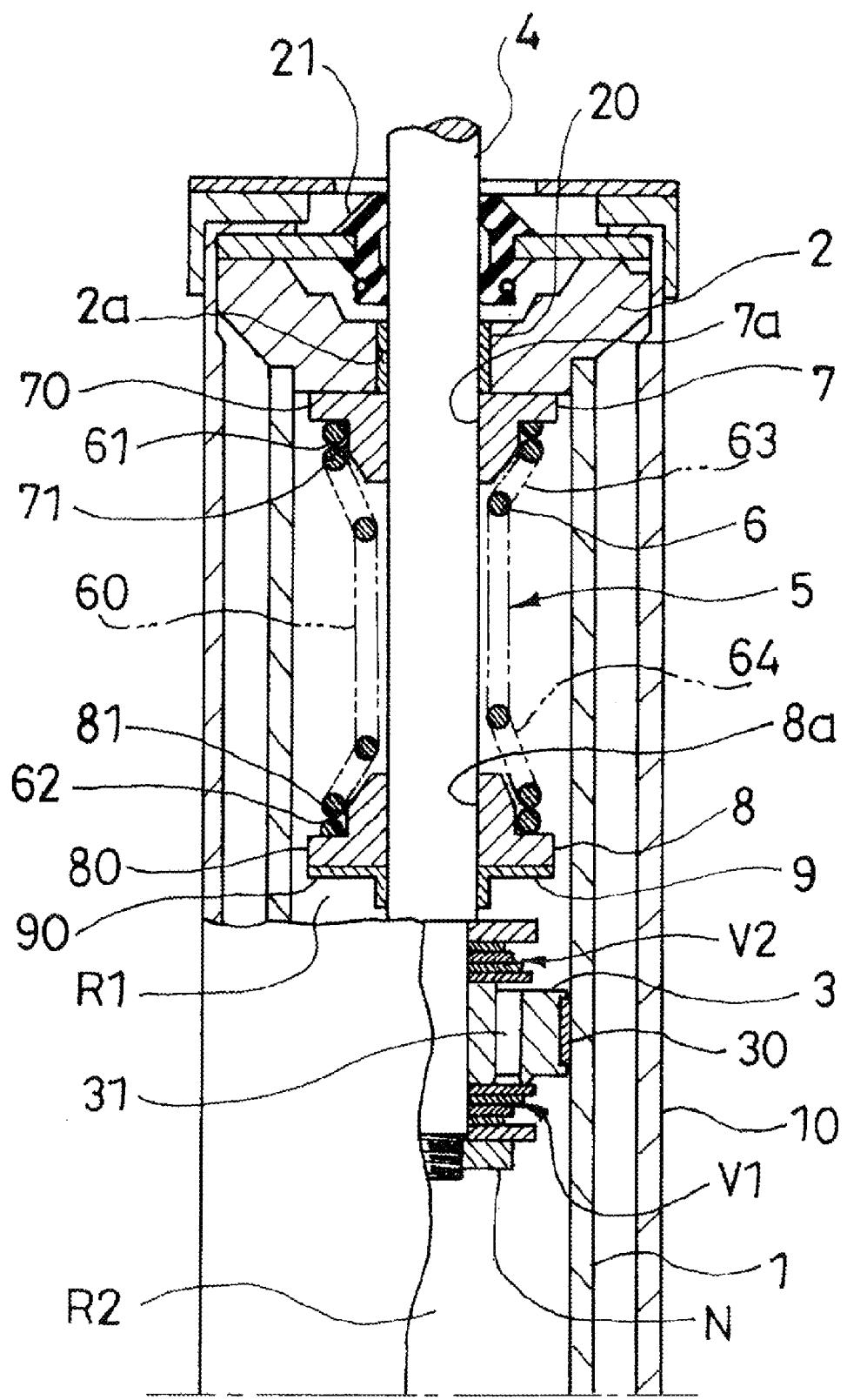
FIG. 1 is a partially cutaway front view illustrating a main part of a cylinder unit according to an embodiment of the invention.

Hereinafter, a cylinder unit according to an embodiment of the present invention will be described with reference to the accompanying drawings. Throughout some drawings, like reference numerals denote like elements or equivalents thereof.

As illustrated in FIG. 1, the cylinder unit according to the present embodiment includes a cylinder 1, an annular rod guide 2 provided in one end side of the cylinder 1, a piston 3 having an outer circumference slidably adjoining an inner circumference of the cylinder 1, a piston rod 4 that is movably inserted into the cylinder 1 by interposing the piston 3 and passes through the rod guide 2, and a rebound member 5 provided between the rod guide 2 and the piston 3 to absorb impact generated when the cylinder unit is fully extended.

The rebound member 5 includes a coil spring 6 arranged around an outer circumference of the piston rod 4 and a pair of upper and lower holder members 7 and 8 fitted to fixing portions 61 and 62 formed in both ends of the coil spring 6 and in which the piston rod 4 is inserted into the shaft center holes 7a and 8a, respectively. The center portion 60 formed between the fixing portions 61 and 62 of the coil spring 6 is formed to have a diameter smaller than that of the fixing portions 61 or 62.

The cylinder unit is a hydraulic shock absorber interposed between a chassis and an axle of an automobile to absorb a vibration caused by an uneven road surface. The cylinder unit is a twin tube shock absorber having an outer casing 10 concentrically arranged outside the cylinder 1.

The rod guide 2 provided in one end side (upper side in the drawing) of the cylinder 1 is fitted to an upper end portion of the cylinder 1 and an upper portion of the outer casing 10. In the center of the rod guide 2, a guide hole 2a that guides the piston rod 4 is provided. The piston rod 4 is slidably supported by the rod guide 2 by interposing the annular bearing 20 fitted to the guide hole 2a.

On an upper surface of the rod guide 2, a seal member 21 that seals a gap between the piston rod 4 and the rod guide 2 is provided. The rod guide 2 and the seal member 21 are fixed to the outer casing 10 and the cylinder 1 by caulking an upper end portion of the outer casing 10.

The internal space of the cylinder 1 is partitioned into a pair of chambers R1 and R2 by the piston 3 fixed to the leading end of the piston rod 4 using a nut N. An extension chamber R1 is formed in the piston rod 4 side of the cylinder 1, and a compression chamber R2 is formed in the piston 3 side. A working fluid is charged in each chambers R1 and R2.

The piston 3 slidably adjoins the inner circumference of the cylinder 1 by interposing the seal 30 provided in the outer circumference thereof. In addition, the piston 3 is provided with an extension fluid path 31 and a compression fluid path (not illustrated) communicating with the extension chamber R1 and the compression chamber R2, respectively.

The surface of the piston 3 in the compression chamber R2 side is provided with an extension valve V1 that openably/closably blocks the extension fluid path 31. The surface of the piston 3 in the extension chamber R1 side is provided with a compression valve V2 that openably/closably blocks the compression fluid path.

A cylindrical stopper member 9 fixed to the outer circumference of the piston rod 4 by welding, forcible insertion, or the like is provided vertically over the piston 3. The stopper member 9 has an annular flange portion 90 overhanging to the outside.

The rebound member 5 is provided between the flange portion 90 of the stopper member 9 and the rod guide 2. The rebound member 5 includes a coil spring 6 and a pair of upper and lower holder members 7 and 8 fitted to the fixing portions 61 and 62 formed in both ends of the coil spring 6.

Each holder member 7 and 8 includes shaft center holes 7a and 8a drilled in the shaft center portion to insert the piston rod 4, flange portions 70 and 80 overhanging in the outer circumference of the end portion and abutting on both ends of the coil spring 6, and guide portions 71 and 81 fitted to the inner circumferences of the fixing portions 61 and 62, respectively, of the coil spring 6 and arranged to face each other.

The outer circumferences of the leading ends of each guide portion 71 and 81 are formed in a tapered shape such that a diameter is gradually reduced. The upper holder member 7 is slidably provided in the outer circumference of the piston rod 4, and the lower holder member 8 is forcibly inserted into and fixed to the outer circumference of the piston rod 4.

Figure 2:
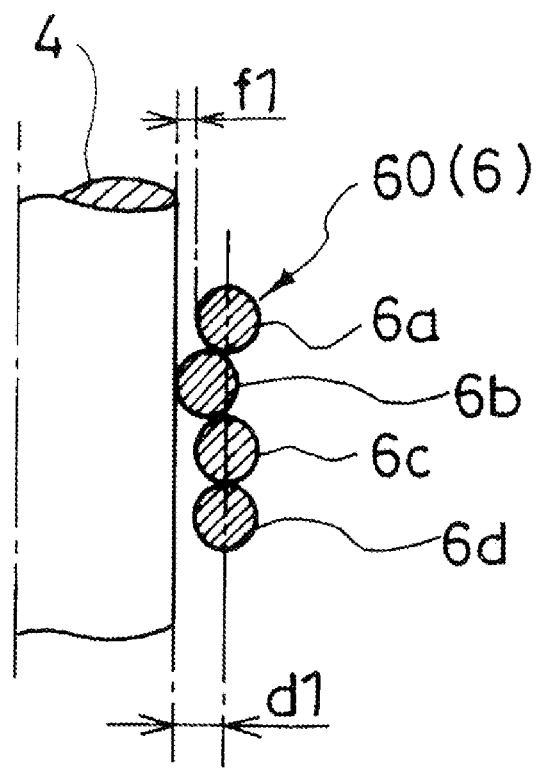
FIG. 2 is a half cross-sectional view illustrating a center portion of a coil spring when the cylinder unit according to an embodiment of the invention is fully extended.

The coil spring 6 is a circular cross-sectional wire rod formed by the coil portions 6a, 6a, 6c, and 6d forming to be continuously connected in the axial direction (FIG. 2). As illustrated in FIG. 1, the coil spring 6 includes fixing portions 61 and 62 formed in both ends, diameter-reducing portions 63 and 64 whose diameters are gradually reduced compared to those of the fixing portions 61 and 62, respectively, and a center portion 60 formed between the diameter-reducing portions 63 and 64 with a small diameter.

The diameter-reducing portions 63 and 64 of the coil spring 6 are set not to make contact with the leading end of the guide portion 71 or 81 formed in a tapered shape.

In the cylinder unit according to the present embodiment, when the cylinder unit is extended, the extension chamber R1 is compressed so that the working fluid in the extension chamber R1 pressedly opens the extension valve V1 and moves to the inside of the compression chamber R2 through the extension fluid path 31 to generate a damping force. In this case, as the piston rod 4 is exited, the rebound member 5 is underpinned by the stopper member 9 and moves upward in the drawing so that the piston 3 approaches the rod guide 2.

When the cylinder unit is nearly fully extended, the upper holder member 7 abuts on the lower surface of the rod guide 2. When the cylinder unit is fully extended, the coil spring 6 is fully compressed. As a result, impact generated when the cylinder unit is fully extended is absorbed.

Figure 4:
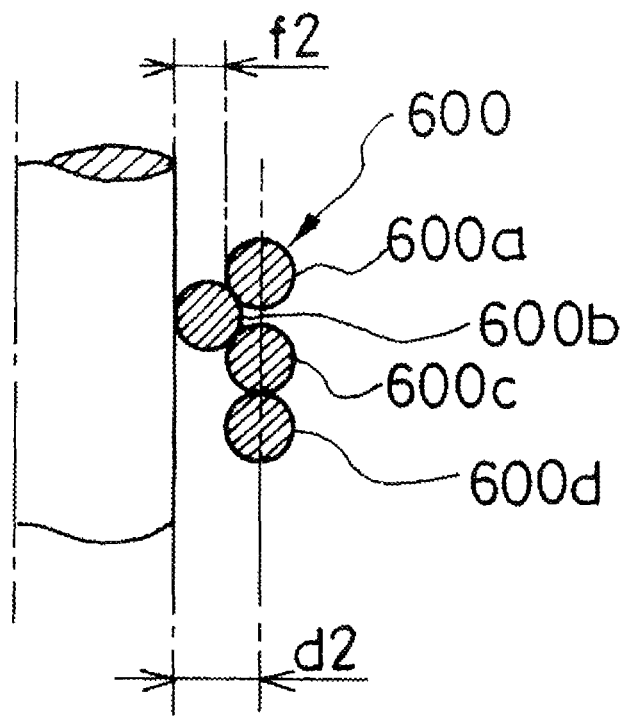
FIG. 4 is a half cross-sectional view illustrating a center portion of the coil spring when a cylinder unit of the related art is fully extended.

Since the center portion 60 has a smaller diameter than that of the fixing portion 61 or 62 of the coil spring 6 where the guide portions 71 and 81 are fitted, a distance d1 (FIG. 2) between the center portion 60 and the piston rod 4 is shortened compared to a distance d2 (FIG. 4) between the coil spring 600 of the related art and the piston rod 4. As a result, even when a part of the coil portion 6b is moved in a diameter direction, the coil portion 6b abuts on the piston rod 4 before a movement amount (shift length) becomes large compared to the related art.

Therefore, the movement amount f1 (FIG. 2) of the coil portion 6b becomes smaller than the movement amount f2 (FIG. 4) of the coil portion 600b of the related art. Accordingly, it is possible to suppress generation of an abnormal noise without changing a cross-sectional shape of the coil spring 6. The movement amount f1 is preferably set to be smaller than 1 mm.

As illustrated in FIG. 1, the center portion 60 of the coil spring 6 is preferably formed across a wide area between the holder members 7 and 8. In the aforementioned configuration, it is possible to reliably suppress generation of an abnormal noise.

In addition, the coil spring 6 has diameter-reducing portions 63 and 64, and the fixing portions 61 and 62 are formed in a large diameter. Therefore, it is possible to increase a strength by forming the guide portions 71 and 81 of the holder members 7 and 8, respectively, in a large diameter.

Therefore, it is possible to form the rebound member 5 in a compact manner by obtaining a press-fitting portion using the flange portion 80 and the guide portion 81 when the lower holder member 8 is forcibly inserted into the outer circumference of the piston rod 4.

The outer circumferences of the leading ends of the guide portions 71 and 81 of the holder members 7 and 8, respectively, are formed in a tapered shape by gradually reducing a diameter such that the diameter-reducing portions 63 and 64 do not make contact with the leading ends of the tapered guide portions 71 and 81, respectively. In addition, the diameter-reducing portions 63 and 64 do not make contact with the guide portions 71 and 81, respectively, even when the cylinder unit is fully extended. Therefore, it is possible to increase a length of the center portion 60 in an axial direction and avoid interference between the diameter-reducing portions 63 and 64 and the guide portions 71 and 81, respectively.

The embodiments of the present invention described above are merely illustration of some application examples of the present invention and not of the nature to limit the technical scope of the present invention to the specific constructions of the above embodiments.

Figure 3:
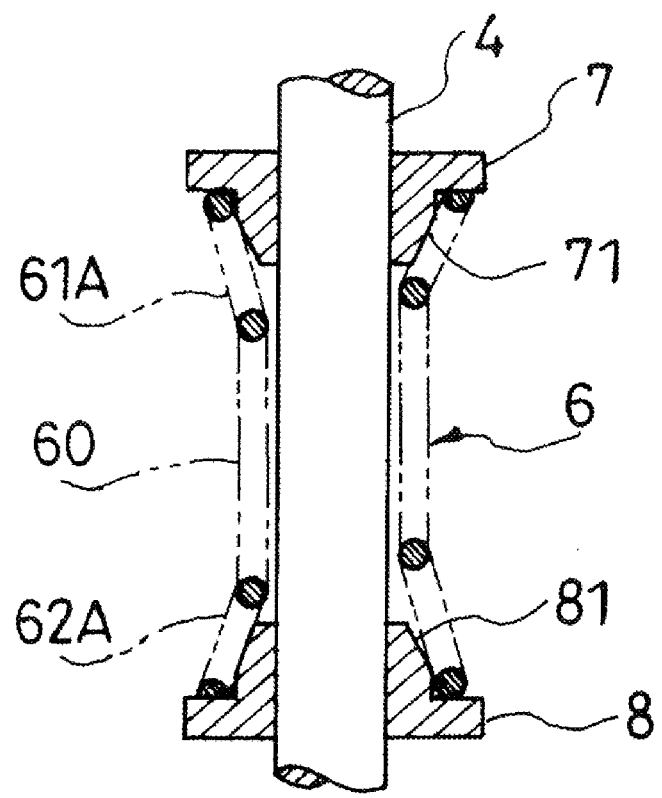
FIG. 3 is a vertically cross-sectional view illustrating a modification of the coil spring of the cylinder unit according to an embodiment of the invention.

For example, as illustrated in FIG. 3, the coil spring 6 may be formed such that a center portion 60 having a small diameter is arranged between fixing portions 61A and 62A whose diameters are gradually reduced to the center. In this case, diameters of the outer circumferences of the guide portions 71 and 81 of the holder members 7 and 8, respectively, are gradually reduced.

Even in this case, similar to the aforementioned embodiment, it is possible to prevent generation of an abnormal noise without changing the cross-sectional shape of the coil spring 6 and increase the length of the center portion 60 in an axial direction.

In the aforementioned embodiment, description has been made by assuming that the cylinder unit is a twin tube shock absorber. However, the cylinder unit may be similarly applied to a mono tube shock absorber or a gas spring.

Although the diameter-reducing portion or the fixing portion is linearly inclined in the drawings, the diameter-reducing portion or the fixing portion may be inclined in a circular arc shape.

Although the guide portions of the upper and lower holder members have the same inclination angle in the drawings, the guide portions may have different inclination angles.

The present application claims a priority based on Japanese Patent Application No. 2011-058741 filed with the Japan Patent Office on Mar. 17, 2011, all the contents of which are hereby incorporated by reference.

The invention claimed is:

1. A cylinder unit, comprising:
a cylinder;
an annular rod guide provided in one end side of the cylinder;
a piston having an outer circumference slidably adjoining an inner circumference of the cylinder;
a piston rod that is movably inserted into the cylinder by interposing the piston so as to pass through the rod guide; and
a rebound member provided between the rod guide and the piston to absorb impact generated when the cylinder unit is fully extended,
wherein
the rebound member comprises
a coil spring arranged around an outer circumference of the piston rod so as not to make contact with the inner circumference of the cylinder, the coil spring being a circular cross-sectional wire, and
an upper holder member and a lower holder member fitted to fixing portions formed in both ends of the coil spring, wherein the piston rod is inserted into a shaft center hole of each of the upper holder member and the lower holder member,
when the cylinder unit is fully extended, the coil spring is fully compressed and does not make contact with the inner circumference of the cylinder,
the upper holder member is slidable along the outer circumference of the piston rod and the lower holder member is fixed to the outer circumference of the piston rod, and
the coil spring has a center portion formed between the fixing portions of the coil spring, and the center portion has a diameter smaller than that of the fixing portions.

2. The cylinder unit according to claim 1,
wherein the coil spring includes the fixing portions, diameter-reducing portions whose diameters are gradually reduced from the fixing portions, and the center portion formed between the diameter-reducing portions.

3. The cylinder unit according to claim 2, wherein
the center portion is formed across a wide area between the upper holder member and the lower holder member.

4. The cylinder unit according to claim 2, wherein
each of the upper holder member and the lower holder member has a guide portion fitted to an inner circumference of the corresponding fixing portion,
a diameter of an outer circumference of a leading end of the guide portion of each of the upper holder member and the lower holder member is gradually reduced, and
each of the diameter-reducing portions of the coil spring is set not to make contact with the leading end of the corresponding guide portion.

5. The cylinder unit according to claim 4, wherein
the diameter-reducing portion of the coil spring is formed in a tapered shape and the leading end of the guide portion is formed in a tapered shape, and
a taper of the tapered shape of the diameter-reducing portion of the coil spring and a taper of the tapered shape of the leading end of the guide portion have different inclination angles.

6. The cylinder unit according to claim 2, wherein
the upper holder member includes a first diameter-reducing portion having a diameter gradually reduced toward the lower holder member,
the first diameter-reducing portion is located within, without contacting, one of the diameter-reducing portions of the coil spring,
the lower holder member includes a second diameter-reducing portion having a diameter gradually reduced toward the upper holder member, and
the second diameter-reducing portion is located within, without contacting, another one of the diameter-reducing portions of the coil spring.

7. The cylinder according to claim 1, wherein
the coil spring includes a plurality of coils,
when the coil spring is fully compressed,
the coils neighboring along an axial direction of the coil spring contact each other, and
one of the plurality of coils is shifted in a radial direction of the coil spring to abut the piston rod without making contact with the inner circumference of the cylinder.

8. The cylinder unit according to claim 1, wherein
a distance between the center portion of the coil spring and the piston rod is smaller than 1 mm.

9. A cylinder unit, comprising:
a cylinder;
an annular rod guide provided in one end side of the cylinder;
a piston having an outer circumference slidably adjoining an inner circumference of the cylinder;
a piston rod that is movably inserted into the cylinder by interposing the piston so as to pass through the rod guide; and
a rebound member provided between the rod guide and the piston to absorb impact generated when the cylinder unit is fully extended,
wherein
the rebound member comprises
a coil spring arranged around an outer circumference of the piston rod so as not to make contact with the inner circumference of the cylinder, the coil spring being a circular cross-sectional wire, and
an upper holder member and a lower holder member fitted to fixing portions formed in both ends of the coil spring, wherein the piston rod is inserted into a shaft center hole of each of the upper holder member and the lower holder member, and each of the upper holder member and the lower holder member has a guide portion fitted to an inner circumference of the corresponding fixing portion, when the cylinder unit is fully extended, the coil spring is fully compressed and does not make contact with the inner circumference of the cylinder, the coil spring has a center portion formed between the fixing portions of the coil spring, and the center portion has a diameter smaller than that of the fixing portion, the coil spring further includes diameter-reducing portions whose diameters are gradually reduced from the fixing portions, a diameter of an outer circumference of a leading end of the guide portion of each of the upper holder member and the lower holder member is gradually reduced, and each of the diameter-reducing portions of the coil spring is set not to make contact with the leading end of the corresponding guide portion.

10. The cylinder unit according to claim 9, wherein the diameter-reducing portion of the coil spring is formed in a tapered shape and the leading end of the guide portion is formed in a tapered shape, and a taper of the tapered shape of the diameter-reducing portion of the coil spring and a taper of the tapered shape of the leading end of the guide portion have different inclination angles.

* * * * *